(12) United States Patent
Chiu

(10) Patent No.: US 6,580,929 B1
(45) Date of Patent: Jun. 17, 2003

(54) MOBILE PHONE CHARGER ALSO FUNCTIONING AS A REMOTE SOUND MONITORING DEVICE

(75) Inventor: Hung-Che Chiu, Taipei (TW)

(73) Assignee: Mitake Information Corporation, Taipei (TW)

( * ) Notice: Subject to any disclaimer, the term of this patent is extended or adjusted under 35 U.S.C. 154(b) by 398 days.

(21) Appl. No.: 09/669,918

(22) Filed: Sep. 27, 2000

(51) Int. Cl.$^7$ ............................................. H04B 1/38
(52) U.S. Cl. ...................... 455/573; 455/550; 381/26; 381/311
(58) Field of Search ................... 455/550, 572, 455/573, 574, 575, 115, 420, 9, 67.1; 381/26, 74, 75, 302, 311

(56) References Cited

U.S. PATENT DOCUMENTS

| | | | | |
|---|---|---|---|---|
| 3,906,160 A | * | 9/1975 | Nakamura et al. ............ | 179/15 |
| 4,882,745 A | * | 11/1989 | Silver .......................... | 455/90 |
| 4,930,148 A | * | 5/1990 | Lee ............................. | 381/74 |
| 5,892,447 A | * | 4/1999 | Wilkinson ................... | 455/575 |

* cited by examiner

Primary Examiner—Thanh Cong Le
Assistant Examiner—Thuan T. Nguyen
(74) Attorney, Agent, or Firm—Rosenberg, Klein & Lee

(57) ABSTRACT

A mobile phone charger also functioning as a remote sound monitoring device is provided. The charger internally includes a high-sensitive microphone, a DTMF decoder, and a central processing unit (CPU). When a handset of a mobile phone is disposed in a handset w/battery charging socket on the charger, an in-car hand-free enabling circuit in the charger is enabled for the handset in the charger to charge while entering into a hand-freemode. At this point, the charger substitutes for the handset and the CPU in the charger automatically receives signals of in-coming call over the mobile phone and the mobile phone does not ring. On receipt of a signal of an in-coming call, the CPU prompts the caller to enter a code that is decoded and compared by the DTMF decoder with a code preset in the CPU. When the entered code is determined as correct, the high-sensitive microphone is turned on to pick up sound at the site of charging and transmits the picked sound via the handset for the caller to perform a sound monitoring from a remote position.

1 Claim, 5 Drawing Sheets

MOBILE PHONE CHARGER ALSO FUNCTIONING AS A REMOTE SOUND MONITORING DEVICE

BACKGROUND OF THE INVENTION

The present invention relates to a mobile phone charger, and more particularly to a mobile phone charger that includes internal in-car hand-free enabling circuit and high-sensitive microphone and therefore permits a mobile phone disposed in the charging socket to enter into a hand-free mode while the microphone picks up a sound source at the site of charging. The picked sound source may be transmitted via a communication network to which the mobile phone is connected. A caller of an in-coming call over the mobile phone under charging may enter a preset code to perform a sound monitoring from a remote position.

A conventional remote sound monitoring device designed for securing purpose usually has a limited data transmission distance within the range from 50M to 500M, depending on the radio frequency designed for the device. And, such remote sound monitoring device transmits data in the manner of analog transmission and is therefore subject to bugged by other detecting devices. Moreover, such remote sound monitoring device is powered by batteries and not adapted to monitor for a prolonged time period. These problems prevent the conventional remote sound monitoring device from working ideally.

SUMMARY OF THE INVENTION

A primary object of the present invention is to provide a mobile phone charger that may also function as a remote sound monitoring device to transmit picked sound via a communication network to which a mobile phone disposed in the charger is connected.

In an aspect of the present invention, the charger includes a handset w/battery charging socket that is electrically connected to an in-car hand-free enabling circuit internally provided in the charger. When a mobile phone is disposed in the handset w/battery charging socket, it is automatically switched into the hand-free mode, and the ringing, receiving, and calling functions of the mobile phone are replaced by a high-sensitive microphone internally provided in the charger.

In another aspect of the present invention, the charger internally includes a high-sensitive microphone and related amplifying circuit and a central processing unit (CPU). When a handset of a mobile phone is disposed in a handset w/battery charging socket on the charger, an in-car hand-free enabling circuit in the charger is enabled for the handset in the charger to charge while entering into a hand-free mode and in a standby state. At this point, the charger substitutes for the handset and the CPU in the charger automatically receives signals of in-coming call over the mobile phone and the mobile phone does not ring. On receipt of a signal of an in-coming call, the CPU conditionally turns on the high-sensitive microphone for the latter to pick up sound at the site of charging and transmit the picked sound via a cellular communication network to which the charging handset is connected, so that a caller may perform a sound monitoring from a remote position.

In a further aspect of the present invention, the charger includes a CPU, a high-sensitive microphone and related amplifying circuit, and a DTMF decoder. When a mobile phone is disposed in the charge and the CPU receives a signal of an in-coming call, the CPU beeps to prompt the caller to enter a security code within a preset time period. The entered code is decoded and compared by the DTMF decoder with a code preset in the CPU. Only when the entered code is determined as correct will the high-sensitive microphone be turned on to pick up sound at the site of charging and transmit the picked sound via a cellular communication network to which the charging handset is connected. Therefore, the sound monitoring from a remote position is performed in a strictly confidential manner.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
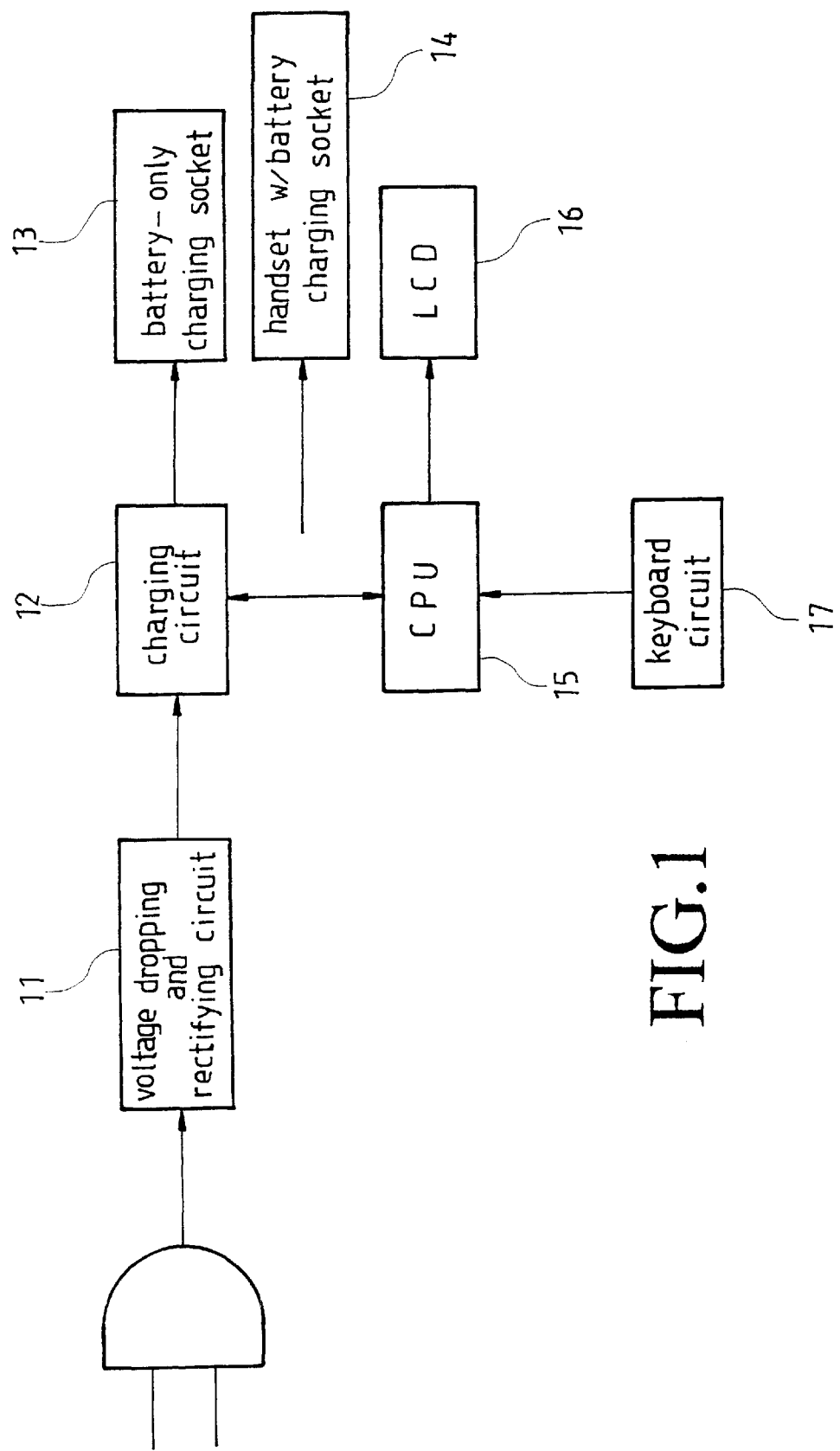
FIG. 1 is a block diagram of a circuitry for a conventional mobile phone charger.

Please refer to FIG. 1 that is a block diagram of a circuitry for a conventional mobile phone charger. In the circuitry, there is mainly a voltage dropping and rectifying circuit 11 connected to a utility power supply for converting the supplied utility power into a direct current (DC) voltage. The converted DC voltage is then output to a charging circuit 12. The charging circuit 12 is electrically connected to a battery-only charging socket 13 and a handset w/battery charging socket 14 on the charger, as well as to a central processing unit (CPU) 15 in the charger. The CPU 15 is further electrically connected to a liquid crystal display (LCD) 16 and a keyboard circuit 17. A charging function may be set via the keyboard circuit 17, so that a battery or a mobile phone may be positioned in the charging sockets 13 and/or 14 and be charged.

Figure 2:
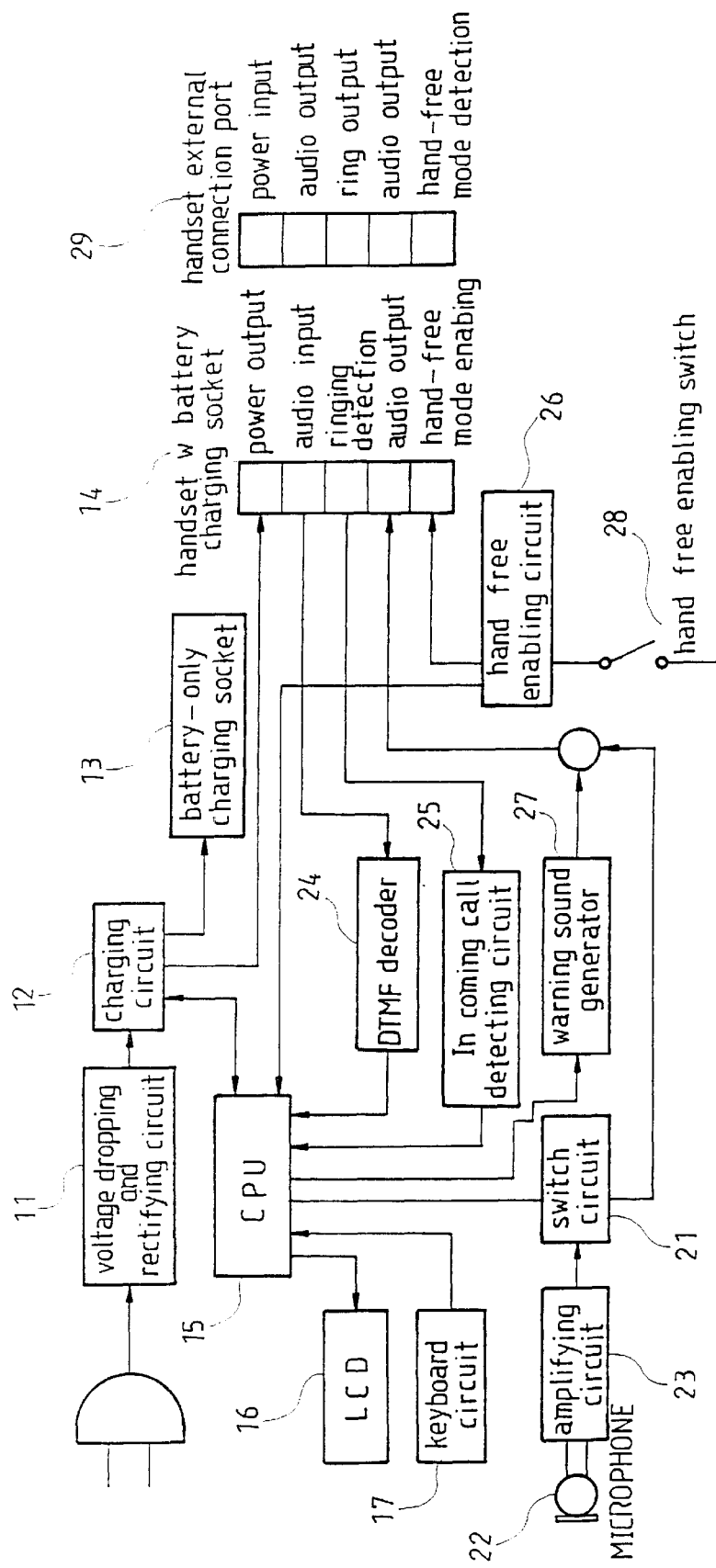
FIG. 2 is a block diagram of a circuitry for a mobile phone charger according to the present invention.

FIG. 2 is a block diagram of a circuitry for a mobile phone charger according to the present invention. This circuitry includes, in addition to the circuits designed for the conventional mobile phone charger, a hand-free enabling circuit 26 electrically connected to the CPU 15. When a handset of a mobile phone is disposed in the handset w/battery charging socket 14 on a charger of the present invention so that the charging socket 14 is electrically connected to a connection port 29 externally provided on the handset, hand-free detecting pins on the handset electrically connect to the hand-free enabling circuit 26 in the charger. When an enabling switch 28 in the hand-free enabling circuit 26 is in the ON state, the handset of the mobile phone in the charging socket 14 enters into an in-car hand-free mode and is in a standby state. The CPU 15 in the charger of the present invention is operated through detecting software and is connected to a switch circuit 21 that is connected to an amplifying circuit 23 and a high-sensitive microphone 22 in order to control the on and off of the amplifying circuit 23.

The charger of the present invention also includes a DTMF decoder 24 that is in the form of an IC and an in-coming call detecting circuit 25, both of which are electrically connected to the handset w/battery charging socket 14 on the charger and accordingly, to the external connection port 29 on the handset of the mobile phone. The in-coming call detecting circuit 25 is capable of detecting signals of in-coming calls and the DTMF decoder 24 is capable of determining a security code entered by a caller. Outputs of the DTMF decoder 24 and the in-coming call detecting circuit 25 are electrically connected to the CPU 15, so that the CPU 15 turns or not turns on the switch circuit 21 based data sent by the in-coming call detecting circuit 25 and the DTMF decoder 24 to the CPU 15. There is also a warning sound generator 27 connected to the CPU 15. When the in-coming call detecting circuit 25 detects a signal of an in-coming call, the warning sound generator 27 sounds to prompt the caller to enter the code.

After the signal of an in-coming call is detected and the code entered by the caller is compared and found correct by the DTMF decoder 24, the CPU 15 turns on the switch circuit 21, enabling the high-sensitive microphone 22 to pick up sound source at the site at where the mobile phone is located and charged. The picked sound source is then output via the connection port 29 to the handset of the mobile phone. The sound sent to the mobile phone could be transmitted over a cellular communication network to which the mobile phone is connected, enabling the caller to perform a sound monitoring from a remote position.

Figure 3:
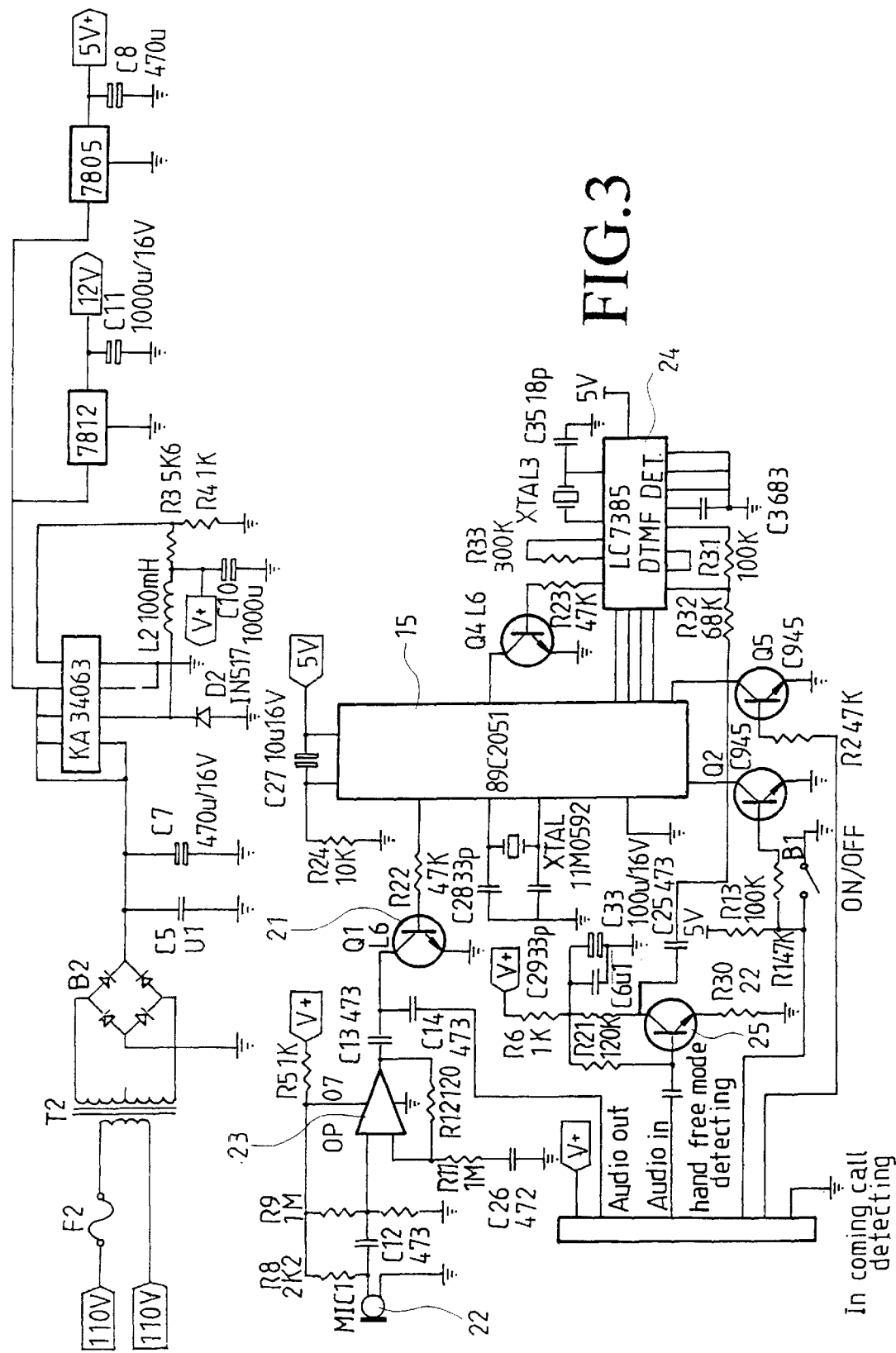
FIG. 3 is a circuit diagram for a mobile phone charger according to a preferred embodiment of the present invention.
Figure 4:
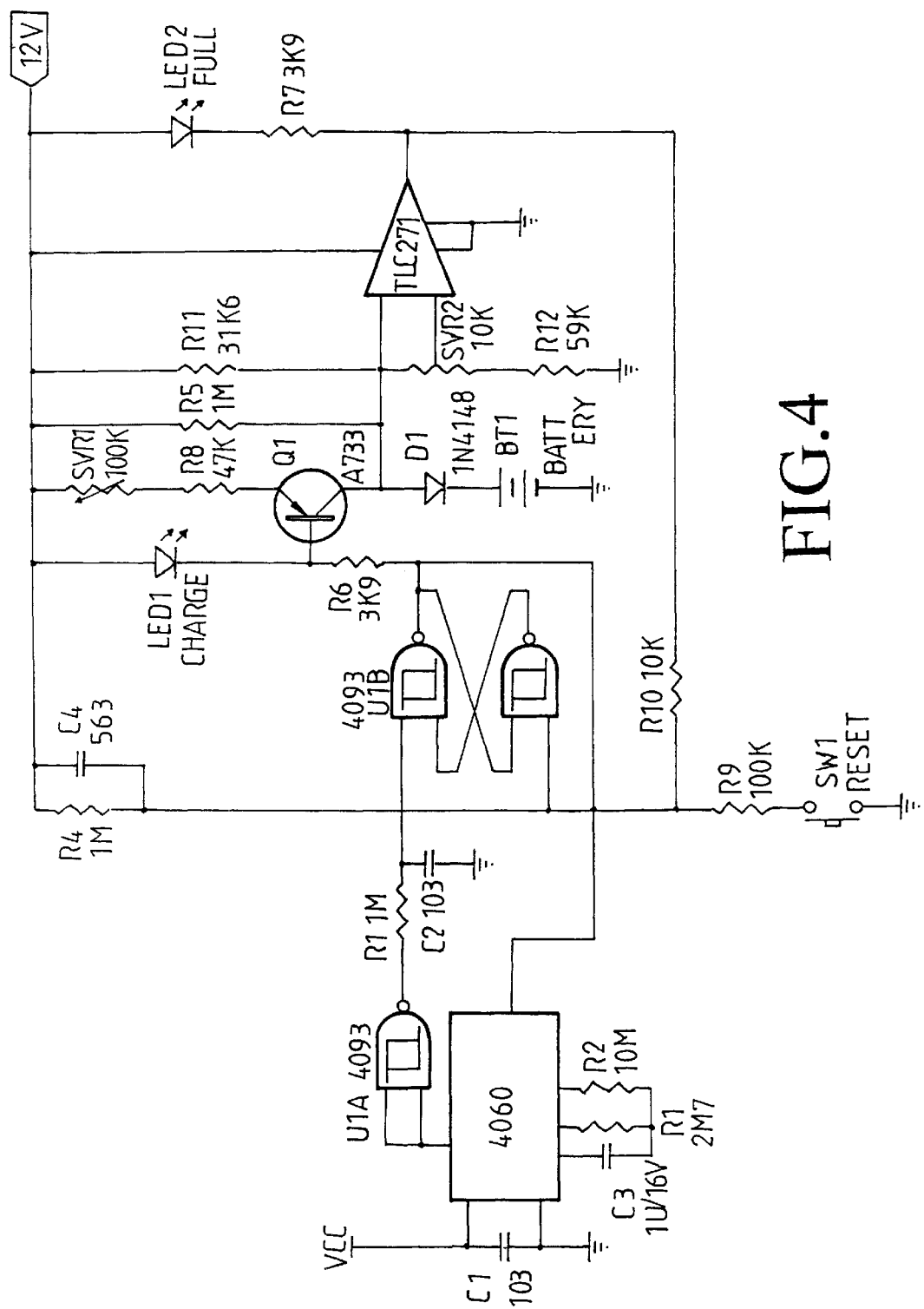
FIG. 4 is a charging circuit diagram for the mobile phone charger of the present invention.

Please now refer to FIGS. 3 and 4 that respectively show an overall circuitry and a charging circuit for the charger according to a preferred embodiment of the present invention. The CPU (89C2501) 15 is connected to the switch circuit 21 composed of Q1, the DTMF decoder (LC9385) 24, and the detecting circuit 25 composed of Q3, R7, C6, etc. The switch circuit 21 is connected at a collector of the Q1 to the amplifying circuit 23 composed of amplifier (OP07) R11, R12, etc. And, an input of the amplifying circuit is connected to the high-sensitive microphone 22. With these arrangements, the detecting circuit 25 is able to detect a signal of an in-coming call and the decoder 24 is able to decode and compare a code entered by a caller with a code preset in the CPU. When the code entered by the caller is found correct by the decoder 24, the switch circuit 21 is caused to turn on for the microphone 22 to pick up a sound source that is then amplified by the amplifying circuit 23. The amplified sound source could be transmitted to the caller via the communication network to which the mobile phone is connected, so that the caller may perform a sound monitoring at a remote position.

The charging circuit for the charger of the present invention includes a flip-flop composed of a UIB. An output of the flip-flop is connected to a comparator composed of a TLC271. When a battery being charged at a BTI is fully charged, the comparator resets the flip-flop. Thus, an automatic charging of the mobile phone is possible on the charger of the present invention.

Figure 5:
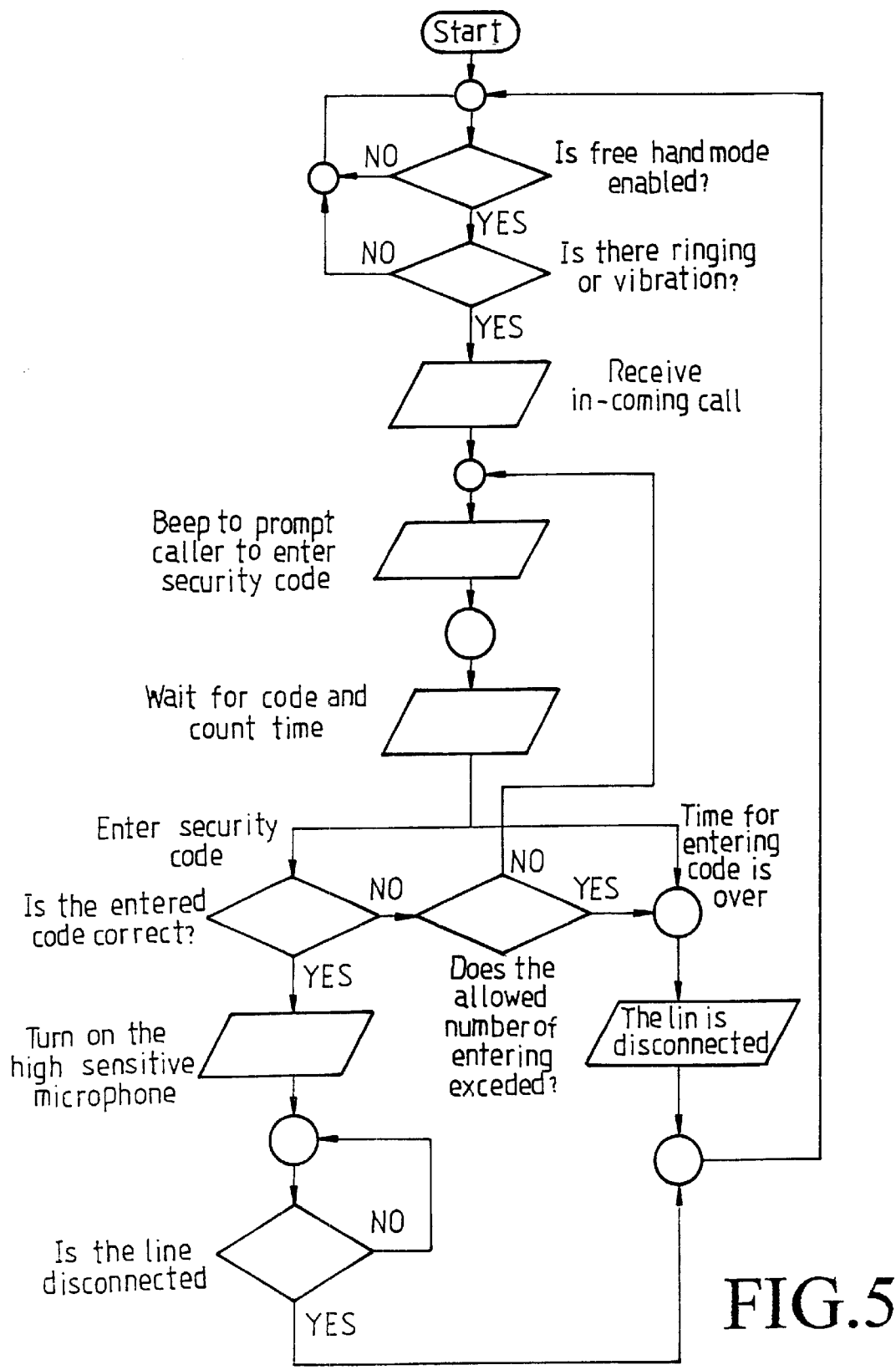
FIG. 5 is a flow chart showing steps included in the operation of the mobile phone charger of the present invention.

FIG. 5 is a flow chart showing steps included in the operation of the charger of the present invention. First, the handset of the mobile phone is disposed in the handset w/battery charging socket 14, so that the hand-free enabling switch 28 enables the hand-free enabling circuit 26 for the handset of the mobile phone in the charging socket 14 to enter into the in-car hand-free mode. At this point, the charger, which is an external device related to the mobile phone, substitutes for the ringing, receiving, and calling functions of the handset of the mobile phone and is in a standby state ready for remote sound monitoring. When there is an in-coming call, the charger beeps to prompt the caller to enter a security code within a specified time period. After the caller enters the code, the charger will determine whether the entered code is correct or not. In the event the entered code is incorrect and the line is still connected, the charger will beep again to prompt the caller to enter the code again. And, in the event the entered code is incorrect and the line is disconnected, the charger restores to the standby state.

On the other hand, when the entered code is determined as correct, the high-sensitive microphone is turned on to pick up sound source at the site, and the sound picked up is transmitted to the caller via the communication network to which the mobile phone is connected, so that the caller is able to perform a sound monitoring from a remote position. When the caller ends the remote sound monitoring and hangs up the phone, the high-sensitive microphone is turned off and the charger restores to the standby state.

In brief, the present invention provides a mobile phone charger that employs a decoder and a high-sensitive pick-up microphone to pick up sound source at the site of charging and transmits the picked sound via the communication network to which the mobile phone is connected. Therefore, the mobile phone charger enables a qualified caller to do sound monitoring from a remote position. Moreover, the charger of the present invention enables the mobile phone disposed in the charging socket of the charger to enter into the in-car hand-free mode with the original ringing, receiving, and calling functions of the mobile phone replaced by the high-sensitive pick-up microphone. The mobile phone charger of the present invention therefore ensures the security at the site of charging and the continuous supply of power to the mobile phone at the same time.

What is claimed is:

1. A mobile phone charger also functioning as a remote sound monitoring device, comprising:

an in-coming call detecting circuit electrically connected to a connecting port externally provided on a handset of a mobile phone disposed in a charging socket on said charger for detecting a ringing signal of an in-coming call;

a decoder electrically connected to said connecting port externally provided on said handset and to a central processing unit (CPU) in said charger for comparing a DTMF code entered by a caller via keys on a phone with a preset code stored in said CPU;

a free-hand enable switch, said free-hand enable switch in an ON state enabling said mobile phone charger to function as a charger and a remote sound monitoring device at the same time, and said free-hand enable switch in an OFF state enabling said charger to function as a regular mobile phone charger;

a switch circuit electrically connected to said CPU and to an amplifying circuit for controlling on or off of an amplifier in said amplifying circuit; and said amplifying circuit being electrically connected to a high-sensitive microphone and said external handset connection port for picking up sound source at the site of charging for the remote sound monitoring purpose;

whereby when said in-coming call detecting circuit detects a signal of an in-coming call, said charger beeps via said CPU to prompt the caller to enter a security code, and said encoder compares said code entered by the caller with a code preset and stored in the CPU of the charger; said high-sensitive microphone is turned on when said entered code is determined as correct in order to pick up sound source at the site of charging; and said sound source picked up at the site of charging is transmitted to the caller over a communication network to which said mobile phone is connected, so that the caller is able to perform a sound monitoring from a remote position.

* * * * *